(12) United States Patent
Kendall (10) Patent No.: US 7,347,038 B1
(45) Date of Patent: Mar. 25, 2008

(54) ENHANCED FORE-AFT MOVEMENT CUTTING ATTACHMENT

(75) Inventor: Donald H. Kendall, Chassell, MI (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/499,984

(22) Filed: Aug. 4, 2006

(51) Int. Cl.
  *A01D 34/00* (2006.01)
(52) U.S. Cl. .......................................... 56/14.9; 56/15.9
(58) Field of Classification Search ................ 56/229,
  56/14.9, 15.9; 144/34.6, 335, 337, 339, 363
  See application file for complete search history.

(56) References Cited

U.S. PATENT DOCUMENTS

| | | | |
|---|---|---|---|
| 1,614,856 | A | 1/1927 | Overbeck, Jr. |
| 2,200,230 | A | 5/1940 | Hojnowski |
| 2,694,282 | A | 11/1954 | Kirby |
| 2,793,487 | A | 5/1957 | Wobermin |
| 2,821,217 | A * | 1/1958 | Shald ......................... 144/34.1 |
| 3,033,253 | A * | 5/1962 | Purdy ......................... 144/34.1 |
| 3,557,850 | A * | 1/1971 | Owens et al. ............... 144/34.6 |
| 3,704,031 | A | 11/1972 | Confer |
| 3,724,579 | A | 4/1973 | Albertson |
| 3,743,316 | A | 7/1973 | Stotesbery |
| 3,770,293 | A | 11/1973 | Anderson |
| 3,841,656 | A | 10/1974 | Kramb et al. |
| 4,162,606 | A | 7/1979 | Weichel |
| 4,253,296 | A | 3/1981 | Boydston |
| 4,658,519 | A | 4/1987 | Quenzi |
| 4,790,085 | A | 12/1988 | Rossman |
| 4,826,103 | A | 5/1989 | McKown |
| 4,946,488 | A | 8/1990 | Davison |
| 5,097,911 | A | 3/1992 | Kendall |
| 5,308,114 | A | 5/1994 | Williams et al. |
| 5,531,478 | A | 7/1996 | Houston et al. |
| 5,586,785 | A | 12/1996 | Warner et al. |
| 5,600,943 | A | 2/1997 | Ryan |
| 5,970,634 | A | 10/1999 | Dann et al. |
| 6,105,680 | A | 8/2000 | High |
| 6,314,707 | B1 | 11/2001 | Ryan |

(Continued)

OTHER PUBLICATIONS

U.S. Appl. No. 10/885,389, filed Jul. 7, 2004, Chopra, Kewal, Hedge Breaching Device.

*Primary Examiner*—Thomas B. Will
*Assistant Examiner*—Mai T Nguyen
(74) *Attorney, Agent, or Firm*—David L. Kuhn; Thomas W. Saur; Luis Miguel Acosta (57) ABSTRACT

A debris cutting system for attachment to a vehicle. The system includes a nose shaped projection that extends horizontally in the forward direction from the forward moving end of the vehicle. The projection includes at least one front blade mount subsystem, at least one rear blade mount subsystem, and at least one blade. The blade has a blade front mounted to the front blade mount subsystem, a blade rear mounted to the rear blade mount subsystem, and teeth. The blade is positioned substantially diagonal to forward movement of the vehicle. The front blade mount subsystem provides longitudinal movement at the blade front, and the rear blade mount subsystem provides arcuate movement at the blade rear such that cutting of debris is enhanced and damage to the blade is reduced as the vehicle moves forward.

6 Claims, 6 Drawing Sheets

U.S. PATENT DOCUMENTS 6,439,279 B1 * 8/2002 Underwood ............... 144/34.6
6,701,646 B2 3/2004 Schultz et al.
6,860,040 B2 3/2005 Schultz et al.

* cited by examiner

ENHANCED FORE-AFT MOVEMENT CUTTING ATTACHMENT

CROSS-REFERENCE TO RELATED APPLICATION(S)

The present application may be related to U.S. application Ser. No. 11/482,299, filed Jun. 26, 2006, "CUTTING ATTACHMENT FOR VEHICLE", which is hereby incorporated by reference in its entirety.

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to a system for a cutting attachment having enhanced fore-aft movement that is generally attached to a vehicle.

2. Background Art

For many vehicles, vegetation, plant undergrowth, vines, as well as ropes, wires, and similar debris or like obstructions present a problem for mobility of the vehicle. Cutters are typically attached to the vehicle to attempt to provide an open path for the vehicle. However, removal or clearing the debris to provide a passable path for the vehicle can take a substantial amount of time and energy when conventional approaches to cutting attachments are used.

In particular, conventional cutter attachments on vehicles often fail to accommodate topographical and obstacle variations (e.g., slopes, hills, rocks, etc.) over which the vehicle passes. In particular, conventional simple slider or shoe devices are implemented on the lateral ends of the conventional cutter device to ride on the terrain to attempt to maintain ground clearance for the cutting mechanism. However, obstructions such as rocks, stumps, and the like may be encountered between the slider devices, and the cutting attachment is often impacted against the obstruction and damaged or broken. Further, conventional cutter attachments often fail to provide for quick and simple replacement of dull or damaged cutting surfaces.

Yet further, the simple forward motion of the vehicle where the conventional cutting attachment is installed ceases to provide any cutting performance when the forward motion of the vehicle is interrupted by obstacles and obstructions.

Thus, there exists a need and an opportunity for an improved cutting attachment (e.g., a system for cutting debris) for a vehicle. Such an improved debris cutting system for attachment to a vehicle may overcome one or more of the deficiencies of the conventional approaches.

SUMMARY OF THE INVENTION

Accordingly, the present invention may provide an improved cutting attachment (e.g., a system for cutting debris) for a vehicle. The improved cutting attachment system of the present invention may be implemented as a system for cutting debris that is mounted to the respective vehicle. The cutting attachment of the present invention may provide enhanced fore-aft movement of at least one cutting blades that are included in the system.

According to the present invention, a debris cutting system for attachment to a vehicle is provided. The system comprises a nose shaped projection that extends horizontally in the forward direction from the forward moving end of the vehicle. The projection comprises at least one front blade mount subsystem, at least one rear blade mount subsystem, and at least one blade. The blade has a blade front mounted to the front blade mount subsystem, a blade rear mounted to the rear blade mount subsystem, and teeth. The blade is positioned substantially diagonal to forward movement of the vehicle. The front blade mount subsystem provides longitudinal movement at the blade front, and the rear blade mount subsystem provides arcuate movement at the blade rear such that cutting of debris is enhanced and damage to the blade is reduced as the vehicle moves forward.

The projection may include a front forward support outcropping and a front rearward support outcropping having a front mount recess on a front side. The front forward support outcropping and the front rearward support outcropping may project laterally outward from the nose-shaped projection and provide support structure for the front blade mount subsystem, and support and hold the blade front within the front blade mount subsystem.

The front blade mount subsystem generally further includes an upper front slide, a lower front slide, a front slide bolt, a slide bar mounted longitudinally between the front forward support outcropping and the front rearward support outcropping, and a front tension spring that is coaxially mounted on the slide bar. The front mount recess holds a first end of the front tension spring. The upper front slide, the blade front, and the lower front slide are mechanically coupled together via the front slide bolt. A second end of the front tension spring compresses the upper front slide and the lower front slide against the front forward support outcropping. The upper front slide and the lower front slide move in the longitudinal direction on the slide rod.

The projection generally further includes a rear outcropping that projects laterally outward from the nose-shaped projection. The rear outcropping generally has an upper arcuate recess and a lower arcuate recess, and provides support structure for the rear blade mount subsystem.

The rear blade mount subsystem includes an upper T-shaped rear tension device that has a respective cylindrically shaped cross-bar and a cylindrically shaped upright bar, a lower T-shaped rear tension device that has a respective cylindrically shaped cross-bar and a cylindrically shaped upright bar, a forward rear longitudinal tension spring, a rearward rear longitudinal tension spring, an upper rear vertical tension helical coil spring, a lower rear vertical tension helical coil spring, and a rear upper clamp that has an upper vertical cylindrical collar that has a respective receiving through bore that slidably receives the vertical bar of the upper T-shaped rear tension device and a rear lower clamp that has a lower vertical cylindrical collar that has a respective receiving through bore that slidably receives the vertical bar of the lower T-shaped rear tension device, and that mechanically couple the blade rear therebetween via rear clamp bolts.

The upper rear vertical tension spring is generally coaxially installed on the vertical bar of the upper T-shaped rear tension device between the cross-bar of the upper T-shaped rear tension device and the upper vertical collar of the rear upper clamp. The lower rear vertical tension spring is generally coaxially installed on the vertical bar of the lower T-shaped rear tension device between the cross-bar of the lower T-shaped rear tension device and the upper vertical collar of the rear lower clamp. The cross-bar of the upper T-shaped rear tension device may be snugly and longitudinally, arcuately, slidably restrained between the forward rear longitudinal tension spring and the rearward rear longitudinal tension spring in the upper arcuate recess. The cross-bar of the lower T-shaped rear tension device may be snugly and laterally, rotatably restrained in the lower arcuate recess.

The upper T-shaped rear tension device and the lower T-shaped rear tension device may be interchangeable. The forward rear longitudinal tension spring and the rearward rear longitudinal tension spring may be interchangeable. The upper rear vertical tension spring and the lower rear vertical tension spring may be interchangeable.

The system of claim may further include a substantially arrowhead shaped tip at the apex of the projection. The arrowhead shaped tip generally intersects, spreads and positions debris to be displaced or cut via the system as the vehicle moves forward.

The above features, and other features and advantages of the present invention are readily apparent from the following detailed descriptions thereof when taken in connection with the accompanying drawings.

BRIEF DESCRIPTION OF THE DRAWINGS

FIGS. 2(A-C) are diagrams illustrating top, side and end views of a vehicle hull implementing an example of the present invention;

FIGS. 3(A-B) are more detailed diagrams of an example implementation of the present invention;

DETAILED DESCRIPTION OF THE PREFERRED EMBODIMENT(S)

With reference to the Figures, the preferred embodiments of the present invention will now be described in detail. Generally, the present invention provides a system for an improved cutting attachment (e.g., a system for cutting debris) for a vehicle. The improved cutting attachment system of the present invention may be implemented as a system for cutting debris (e.g., a "brush blade", and the like) that is mounted (i.e., fastened, fixed, installed, implemented in connection with, etc.) to the respective vehicle.

The present invention generally provides a system that promotes clearing a path for passage of the respective vehicle, protection of the vehicle to reduce damage to the vehicle, clearing a fireline, reducing interference with mine clearing equipment, and protection for an operator of the vehicle from injury. The debris that is generally cut and cleared by the cutting attachment of the present invention may include brush, shrubs, small trees and limbs, roots, vines, rope, sea weed, fence material, wire, cable, and the like.

In one example, the cutting attachment (or cutter) of the present invention may be implemented as stand-alone device that is mounted to a respective vehicle. In another example, the cutting attachment of the present invention may be implemented in connection with a vehicle mounted mine clearing system (not shown, e.g., rollers, flails, cutting disks, and the like). The present invention may be advantageously implemented for use in connection with vehicles that operated on road or off road, through swamps and bogs, and through water.

The present invention generally includes a pair of cutting blades (e.g., a blade sub-assembly) that are semi-movably (and, thus, semi-rigidly) mounted relative to vertical movement of the vehicle, and to forward/rearward (longitudinal) movement of the vehicle. The partially flexible mounting of the blade sub-assembly generally includes slides, springs, and studs (or bolts), as described in detail below. The partially flexible mounting of the blade sub-assembly may reduce or prevent buckling and excessive flexing of the blades as more dense material is cut and thus reduce or prevent blade breakage.

The partially flexible mounting of the blade sub-assembly may further accommodate uneven terrain over which it may be desirable to operate the vehicle. Such uneven terrain may cause undesirable blade bending, buckling and breakage in conventional approaches. The partially flexible mounting of the blade sub-assembly may provide a substantially parallel orientation of the cutting blades relative to the surface over which the vehicle is operated.

The longitudinally partially movable mounting of the blade sub-assembly may further provide an enhanced displacement of debris before, during, and after the cutting process that is performed via the present invention. As the cutting blades are generally orientated diagonally with respect to the forward motion of the vehicle, the longitudinally partially flexible and movable mounting of the blade sub-assembly of the present invention may yet further provide an enhanced sawing motion to the cutting blades.

Figure 1:
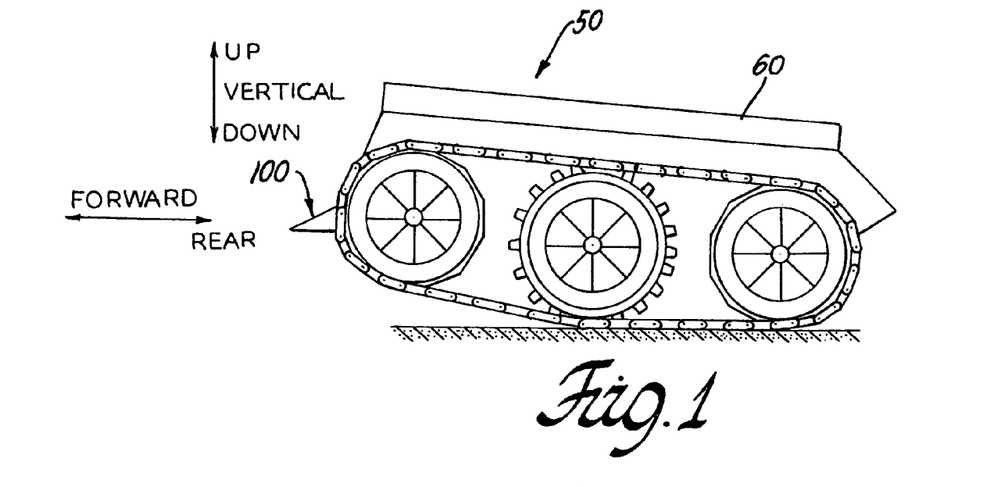
FIG. 1 is a diagram of a vehicle implementing an example of the present invention.

Referring to FIG. 1, a simplified diagram illustrating a vehicle 50 having a cutting attachment system (e.g., apparatus, device, etc.) 100 of the present invention is shown as typically implemented (i.e., installed, mounted, fixed, attached, hooked, fastened, mechanically coupled, integrated within, combined with, made part of, incorporated in connection with, etc.). In one example, the vehicle 50 may be implemented as a manned or unmanned mine clearing device. In another example, the vehicle 50 may be implemented as an unmanned multi-purpose vehicle (e.g., a robotic vehicle). In yet another example, the vehicle 50 may be implemented as a manned or unmanned underwater exploration craft. However, the vehicle 50 may be implemented as any appropriate vehicle to meet the design criteria of a particular application.

Forward/reverse (longitudinal, fore/aft) and vertical (up/down) directions relative to the vehicle 50 and system 100 are generally as illustrated. As such, lateral (left/right) directions (see, for example, FIG. 2A) are generally perpendicular to the longitudinal/vertical plane.

In one example (e.g., as illustrated in FIG. 1), the vehicle 50 may be implemented as a tracked (i.e., track steered and track driven) vehicle. In another example (not shown), the vehicle 50 may be implemented as a wheeled vehicle. In yet another example (not shown), the vehicle 50 may be implemented as a so-called half-track (i.e., steered via wheels and driven via a track system) vehicle. In yet a further example (not shown), the vehicle 50 may be implemented as a ski steered and track system driven vehicle (e.g., a snow mobile). However, the vehicle 50 may be implemented having any appropriate vehicle steering apparatus and driving apparatus to meet the design criteria of a particular application.

The vehicle 50 generally comprises a hull structure 60 to which the cutter assembly 100 is generally attached or made part of. The cutting apparatus 100 is generally implemented on the front of the hull 60 (i.e., on the end of the hull 60 that is at the forward moving end when the vehicle 50 is operated in a normally forward direction). However, when desired to meet the design criteria of a particular application, the cutting apparatus 100 may be implemented on the rear end of the hull structure 60 (not shown).

As such, one example implementation of the present invention may include a cutting apparatus 100 at the front end of the vehicle 50, another example implementation of the present invention may include a cutting apparatus 100 at the rear end of the vehicle 50, and yet another example implementation of the present invention may include cutting apparatuses 100 at both the front end and the rear end of the vehicle 50. Further, multiple instances (not shown) of the cutter assembly 100 may be implemented at either or both ends of the vehicle 50 to meet the design criteria of a particular application. Yet further, one or more of the cutting apparatus 100 may be implemented on the upper surface of the hull 60 such that debris above ground level may be cut and displaced.

Yet further, while the system 100 is generally illustrated as an implementation having a pair of blades (e.g., left and right blades), in another example (not shown), the system 100 may be implemented with a single blade.

Figure 2A:
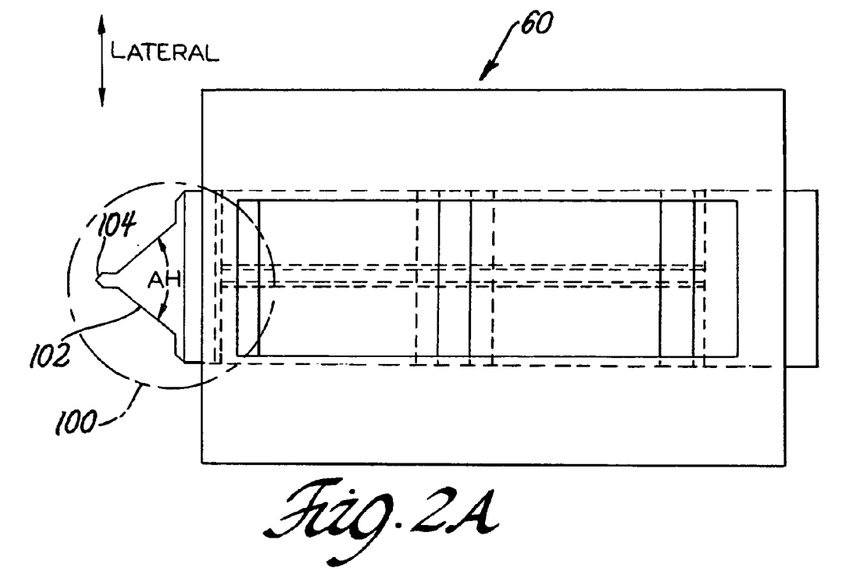
Figure 2B:
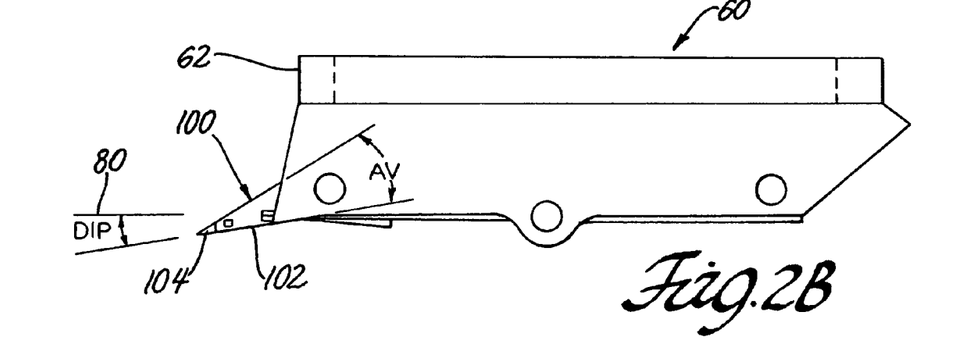
Figure 2C:
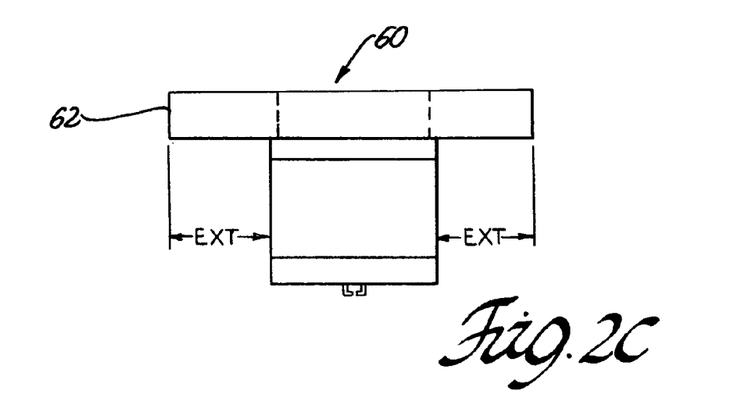

Referring to FIGS. 2(A-C), simplified diagrams illustrating top, side, and rear end views, respectively, of the hull structure 60 are shown in more detail. Details of the vehicle 50 drive/steer mechanism are omitted for clarity. Likewise, some details of the cutting apparatus 100 are omitted for clarity. In one example, the upper portion of the hull 60 may have a deck 62 that may extend past the lower portion of the hull 60 by an amount, EXT. The extension of the deck 62, EXT, may be substantially laterally equal on the left and right sides of the hull 60. Implementation of the extension, EXT, on the lateral sides of the hull 60 may provide a vehicle shape that pushes down debris and thus traverses through debris more readily than a conventional vehicle. The implementation of the extension, EXT, may also urge debris into the cutter apparatus 100 such that the debris is chopped, cut, shredded, and like and, thus, the path through which the vehicle 50 is moving may be cleared more completely than by mere pushing debris aside as is provided by some conventional approaches that lack the overhanging extension EXT.

As illustrated in FIGS. 2A and 2B, the cutter 100 comprises a "nose" shaped (e.g., horizontally oriented pyramid shaped) projection 102 having a narrow (pointed) end that extends in the forward direction from the forward end of bottom side of the structure 60. The cutter 100 may further comprise a substantially triangular shaped or "arrowhead" shaped tip 104 at the apex of the projection 102. The tip 104, in connection with the nose 102, may intersect, spread, and position the debris to be displaced or cut via the cutter system 100 as the vehicle 50 moves forward. The nose shaped structure 102 may be shaped having a horizontal (or lateral) angle, AH, and a vertical angle, AV. Line 80 is a horizontal reference. The nose 102 is generally oriented at an angle, DIP, below the horizontal.

The lateral angle, AH, is generally positioned symmetrically about the central longitudinal axis of the hull 60. However, the lateral angle of the nose 102 may be oriented at any appropriate angle to meet the design criteria of a particular application. The lateral angle, AH, may have a nominal value of 90 degrees, and may have a preferred range of 30 to 120 degrees. The vertical angle, AV, may have a nominal value of 20 degrees, and may have a preferred range of 10 to 45 degrees. The nose angle, DIP, may have a nominal value of 15 degrees below horizontal, and may have a preferred range of 0 to 30 degrees below horizontal.

The pyramid shaped projection 102 in connection with the pointed tip 104, oriented downward at the angle, DIP, may lift debris for cutting via blades on the apparatus 100 rather than bending down the debris thus destroying the debris via the cutting operation.

Figure 3A:
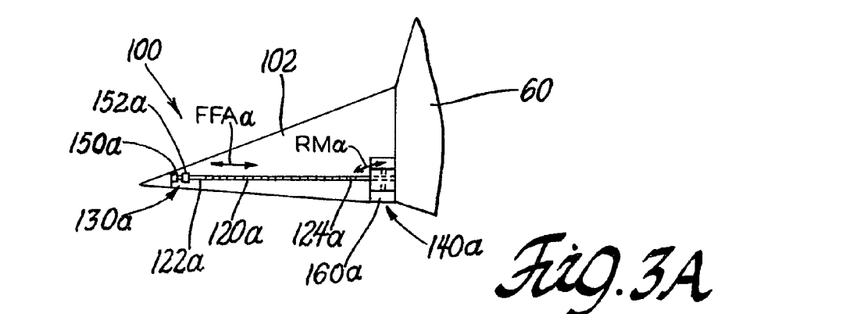
Figure 3B:
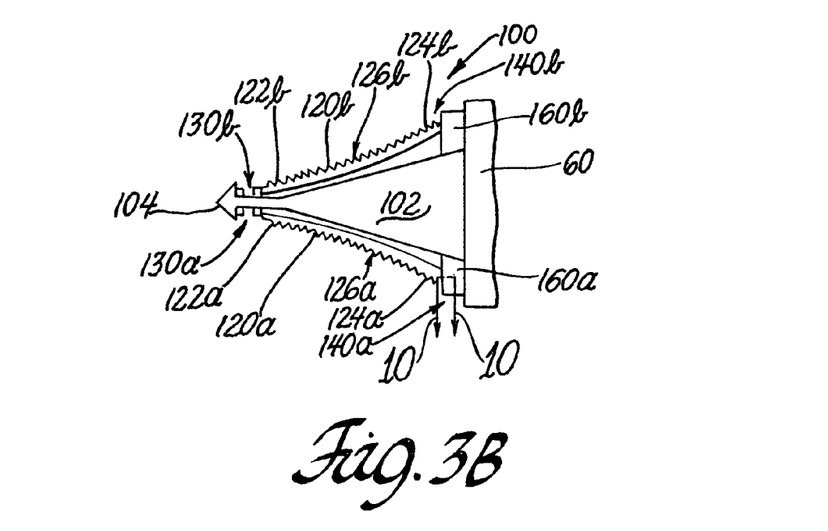
Figure 10:
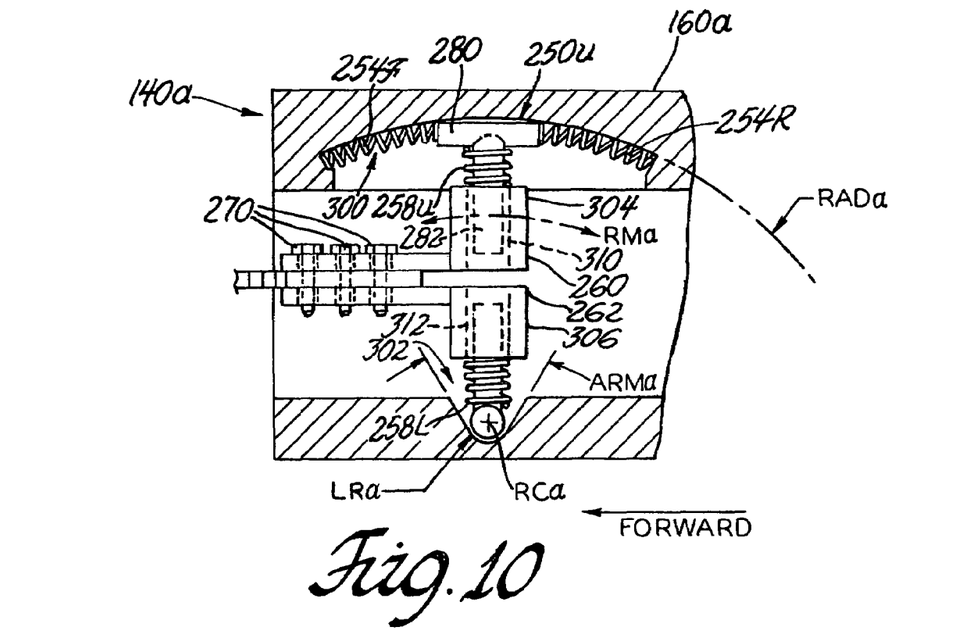
FIG. 10 is a diagram of sectional side view of a rear mounting subsystem of the present invention.

Referring collectively to FIGS. 3(A-B), diagrams illustrating more detailed (yet still simplified) side and top views, respectively, of the cutter assembly 100 are shown. In particular, FIG. 3A is a left side view of the cutter assembly 100, and FIG. 3B is a top view of the cutter system 100. Left and right sides are generally labeled with subscripts a and b, respectively. While both left and right side views are generally not shown, one of ordinary skill in the art would understand the generally symmetric relationship of the respective elements of the present invention. Further, one of ordinary skill in the art would understand that the cutter system 100 may be implemented having a single cutting blade and respective support structure. Figures and respective description that follow FIGS. 3(A-B) provide additional detail not shown in FIGS. 3(A-B). For example, FIG. 10 provides more detail of the structure at a section line 10-10 of FIG. 3B.

The cutter system 100 generally comprises at least one (generally a pair) of blades 120 (e.g., blades 120a and 120b) each having a respective blade front 122 (e.g., blade fronts 122a and 122b), blade rear 124 (e.g., blade rears 124a and 124b) and teeth 126 (e.g., teeth 126a and 126b), at least one (generally a pair) of front blade mount subsystems 130 (e.g., front blade mount subsystems 130a and 130b), and at least one (generally a pair) of rear blade mount subsystems 140 (e.g., rear blade mount subsystems 140a and 140b). The blades 120 are generally oriented in the system 100 with a flat plane in the horizontal plane, and cutting edge containing the teeth 126 pointed outward at about the lateral angle, AH.

The present invention generally provides longitudinal (i.e., fore and aft) movement, FFA (e.g., left side and right side, FFAa, and FFAb (not shown), respectively), at the front of the blades 120 via the front blade mount subsystem 130 (described in more detail in connection with FIGS. 4, 8 and 9). The present invention generally further provides arcuate (i.e., rotational) movement, RM (e.g., left side and right side, RMa and RMb, respectively), about respective lateral axes at the rear of the blades 120 via the rear blade mount subsystems 140 (described in more detail in connection with FIGS. 10 and 11).

The partially constrained/partially free motion of the blades 120 as provided by the movements FFA and RM may provide enhanced cutting performance when compared to conventional approaches via the motion of the blades 120 when an obstruction is encountered as the vehicle 50 proceeds in the forward direction. Further, the partially constrained/partially free motion of the blades 120 may provide reduced damage to the blades 120 when an obstruction is encountered as compared to conventional approaches.

The front movement (i.e., fore/aft movement FFA) and rear movement (i.e., rotational movement RM) of the blades 120 provided by the present invention generally cooperate to provide at least one of (i) more effective blade protection from deformation, damage or breakage, (ii) more effective cutting operation, and (iii) more efficient displacement of debris whether cut or uncut, when compared to conventional approaches.

Figure 6:
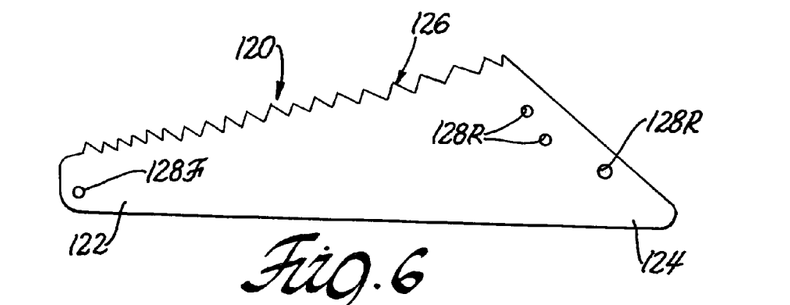
FIGS. 6 and 7 are diagrams of top views of two example blades of the present invention.

In one example, the blades 120 may be implemented having a substantially straight cutting edge (see, for example FIG. 6). In another example, the blades 120 may be implemented having a curved cutting edge (see, for example, FIG. 7). In yet another example, the blades 120 may be implemented having a compound surface (i.e., a combination of straight and curved) cutting edge (not shown).

The projection 102 generally further comprises front forward outcroppings (i.e., projections, bosses, support blocks, flanges, etc.) 150 (e.g., front forward support blocks 150a and 150b), front rearward support outcroppings 152 (e.g., front rearward support blocks 152a and 152b), and rear outcroppings 160 (e.g., rear outcroppings 160a and 160b). The flanges 150, 152, and 160 generally project laterally outward from the nose-shaped projection 102, and provide support structure for the front blade mount subsystem 130 in the case of outcroppings 150 and 152, and for the rear blade mount subsystem 140 in the case of the outcropping 160.

Figures 4, 5:
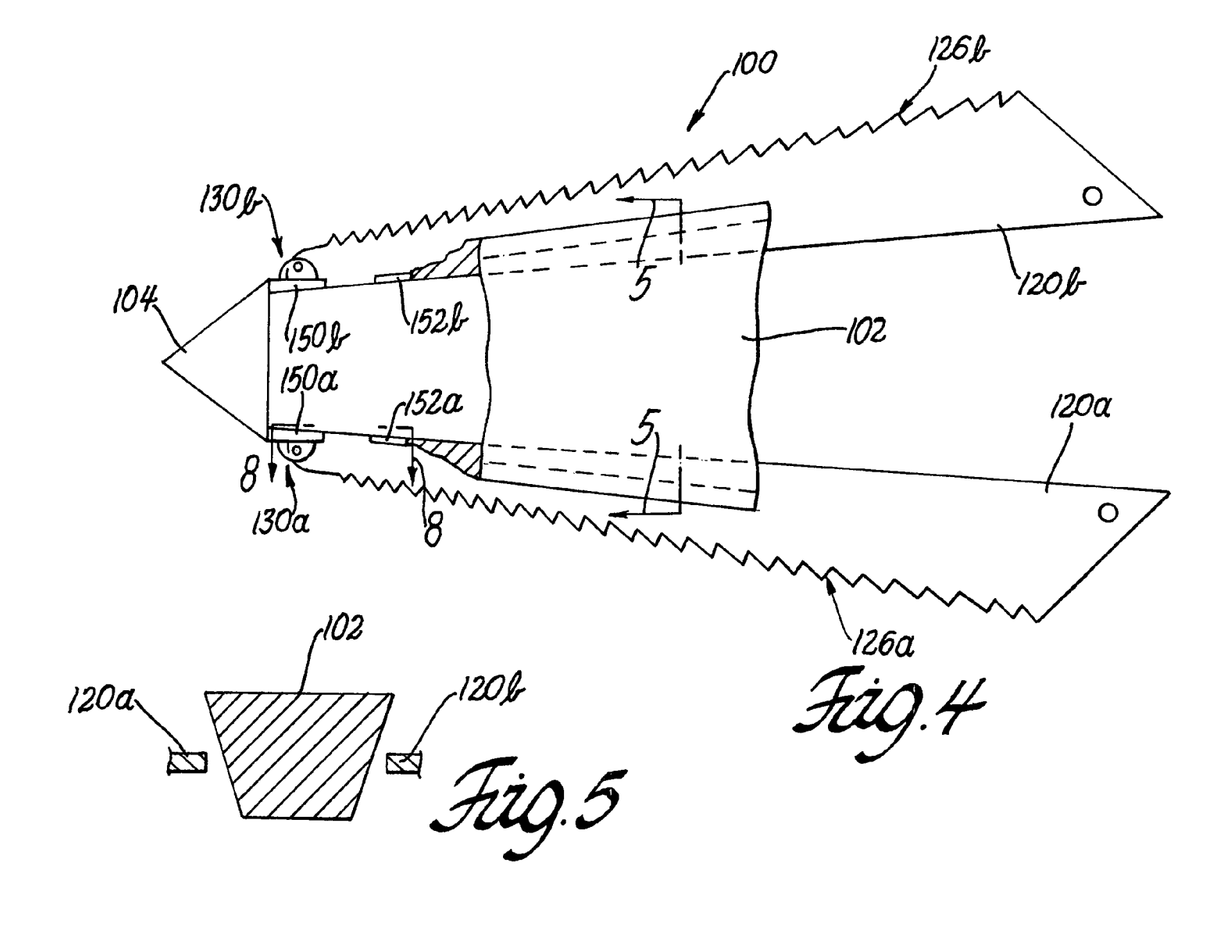
FIG. 4 is a diagram of a partial top view of an example of the cutting system of the present invention.
FIG. 5 is a diagram of a cross section of a projection portion of the present invention.

Referring to FIG. 4, a diagram illustrating a partial top view of one example of the apparatus 100 is shown. A section line 5-5 is taken through the nose-shaped projection 102 and is illustrated as FIG. 5. A section line 8-8 is taken through the nose-shaped projection 102 and is illustrated as FIG. 8. A portion of the front of the nose-shaped projection 102 is not illustrated such that portions of the front blade mount subsystem 130, and the flanges 150, 152 may be shown.

Referring to FIG. 5, a cross-section view of the projection 102 taken at the line 5-5 in FIG. 4 is shown. The nose-shaped extension 102 may have an inverted trapezoidal shape (i.e., the more narrow side of the trapezoid may be on the lower edge of the extension 102). As such, the upper side of the extension 102 is larger that the lower side and may start pushing debris over and away from the cutter blade 120 which may alleviate binding that moisture in woody materials can cause when opening a cut as cutting is performed via the system 100.

Referring to FIG. 6, a top view of one example of a straight blade version of a blade 120 is shown. The blade 120 may have at least one front blade retention hole 128F, and at least one rear retention hole 128R.

Figure 7:
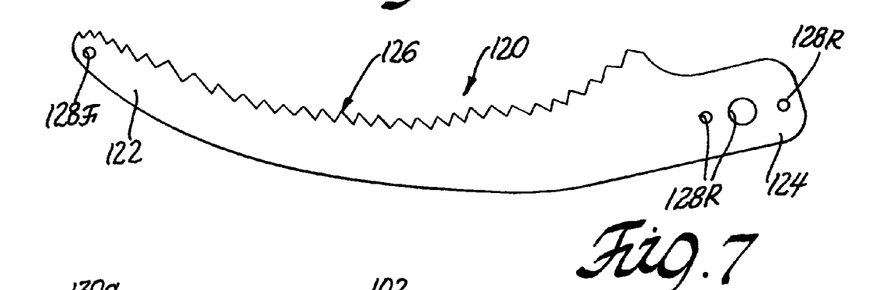

Referring to FIG. 7, a top view of one example of a curved blade version of a blade 120 is shown.

Figure 8:
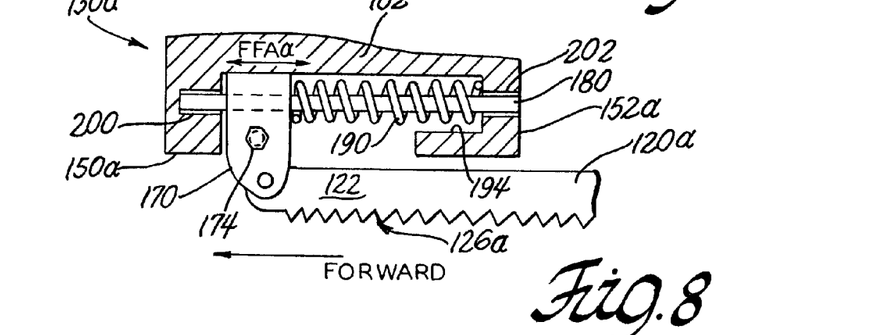
FIG. 8 is a diagram of a sectional side view of an example of a front mounting subsystem of the present invention.
Figure 9:
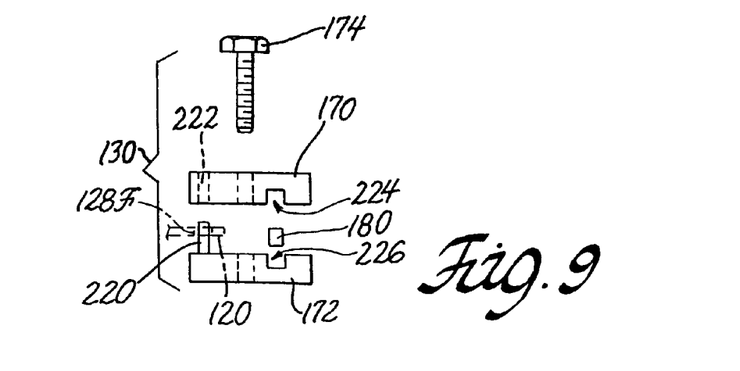
FIG. 9 is a diagram of an exploded, end view of portions of the front mounting subsystem of the present invention.

Referring to FIGS. 8 and 9, in combination, in FIG. 8 a diagram illustrating a sectional view taken at the line 8-8 of FIG. 4 is shown. FIG. 8 provides a more detailed illustration of one example of the left front blade mount subsystem 130a. The right front blade mount subsystem 130b is generally a similar mirror image of the subsystem 130b. FIG. 9 is a diagram of an exploded, end view of elements of the front blade mount subsystem 130.

In one example, the front blade mount subsystem 130 generally comprises an upper front slide 170, a lower front slide 172 (shown, for example, in FIG. 9), a bolt 174, a slide bar (or rod) 180, and a front tension spring 190. A front mount recess (i.e., void, pocket, cutout, etc.) 194 in the forward side of the front rearward outcropping 152 generally holds (i.e., contains, retains, houses, etc.) a first (rearward) end of the front tension spring 190. The upper front slide 170 and the lower front slide 172 are mechanically coupled together, and generally support and hold the blade front 122 within the front blade mount subsystem 130, and slide in the substantially fore/aft direction on the slide rod 180 to provide the movement FFA.

In one example, the slide bar 180 may be implemented as an appropriate length of bar stock having a substantially square cross-section. In another example (not shown), the slide bar 180 may be implemented having a round cross-section. In yet another example (not shown), the slide bar 180 may be implemented having a hexagonal cross-section. However, the slide bar 180 may be implemented having any appropriate cross-sectional shape to meet the design criteria of a particular application. The slide bar 180 is generally configured to hold the upper front slide 170 and the lower front slide 172 such that the upper front slide 170 and the lower front slide 172, in combination with the blade front 122 and the front tension spring 190, perform the movement FFA during normal operation of the system 100.

The outcropping 150 may have a first bar hole 200 that is generally longitudinally oriented and sized to snugly receive a first end of the slide bar 180. The outcropping 152 may have a second bar hole 202 that is generally longitudinally oriented and sized to snugly receive a second end of the slide bar 180. The second bar hole 202 generally cooperates with the front mount recess 194 such that, when installed, the slide bar 180 extends through both the second bar hole 202 and the front mount recess 194.

The upper front slide 170 and the lower front slide 172 are generally fastened together (e.g., mechanically coupled, fixed, attached to each other, threadably joined, etc.) via the bolt 174. The blade 120 (shown in phantom in FIG. 9) is generally clamped at the blade front end 122 between upper front slide 170 and the lower front slide 172. The upper front slide 170 and the lower front slide 172 are generally further mechanically coupled via a vertically extending shaft extension (or stud) 220 on the lower front slide 172 that snugly fits into a mating cylindrical through bore 222 in the upper front slide 170. The shaft extension 220 is generally installed through the front blade retention hole 128F to robustly mechanically couple the blade 120 to the upper front slide 170 and the lower front slide 172.

The slide bar 180 may be removably fixed in place in either or both of the outcroppings 150 and 152 via any appropriate fastening subsystem to meet the design criteria of a particular application. While not shown, such fastening subsystems would be well known to one of ordinary skill in the art to include keying, bolting, pinning, riveting, and the like.

The upper front slide 170 may further comprise an upper half-square (e.g., rectangular) longitudinal channel 224 and the lower front slide 172 may further comprise a lower half-square (e.g., rectangular) longitudinal channel 226. When the upper front slide 170 and the lower front slide 172 are fastened together via the bolt 174, a substantially square (or other shape that is appropriately similar to the cross-sectional shape of the slide bar 180), substantially longitudinally oriented receiving bore is formed via the alignment of the channels 224 and 226. The bore is generally sized to receive the slide bar 180 to provide the fore/aft sliding movement FAA.

The front tension spring 190 is generally implemented as a helical coil spring that provides a predetermined amount of front force during normal operation. The slide bar 180 is generally installed centrally within and through the front tension spring 190. A first (rearward) end of the front tension spring 190 is generally positioned within the front mount recess 194, and a second (forward) end of the front tension spring 190 generally abuts the rear edge of the assembled upper front slide 170 and lower front slide 172, and provides the predetermined front force such that the front edge of the upper front slide 170 and the lower front slide 172 abuts (i.e., rests against) the rear side of the outcropping 150. The front tension spring 190 generally constrains the movement FAA to a predetermined range during normal operation via providing the predetermined front force to the coupled combination of the upper front slide 170 and the lower front slide 172.

Figure 11:
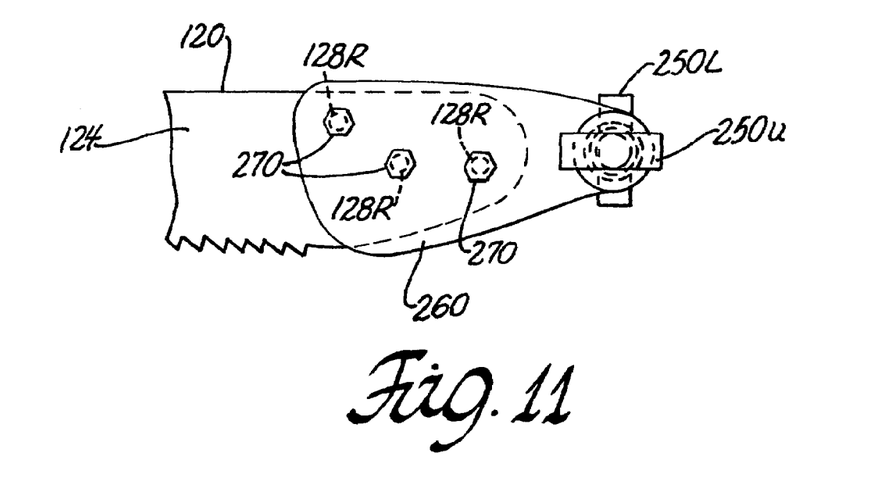
FIG. 11 is a diagram of a top view of a portion of the rear mounting subsystem of FIG. 10.
Figure 12:
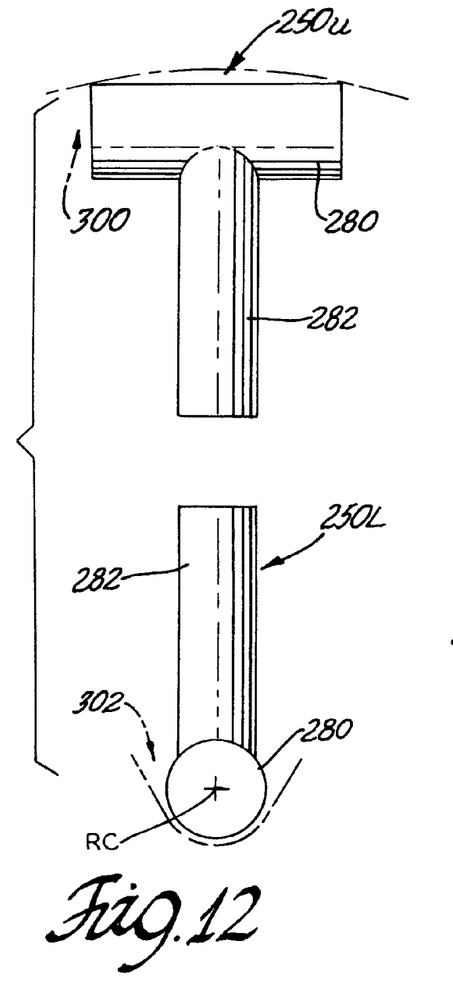
FIG. 12 is a diagram of a side view of elements of the rear mounting subsystem of FIG. 10.
Figure 13:
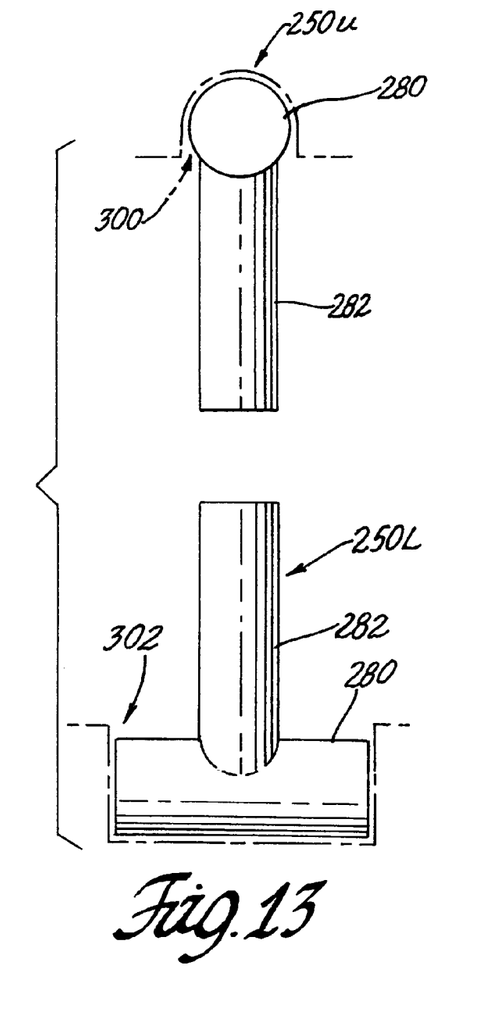
FIG. 13 is a diagram of an end view of the elements of FIG. 12.

Referring to FIGS. 10-13 concurrently, in FIG. 10 a diagram illustrating a sectional view taken at the line 10-10 of FIG. 3B is shown. FIGS. 10-13 may illustrate an example of the rear blade mount subsystem 140. FIG. 10 provides a more detailed illustration of the left rear blade mount subsystem 140a. The right rear blade mount subsystem 140b is generally a similar mirror image of the subsystem 140b. FIG. 11 is a diagram of a top view of elements of the rear blade mount subsystem 140. FIG. 12 is a side view of T-shaped elements of the rear blade mount subsystem 140. FIG. 13 is an end view of T-shaped elements of the rear blade mount subsystem 140.

The rear blade mount subsystem 140 generally comprises a pair of T-shaped rear tension devices 250 (e.g., an upper T-shaped rear tension device 250U and a lower T-shaped rear tension device 250L), a pair of rear longitudinal tension springs 254 (e.g., forward rear longitudinal tension spring 254F and rearward rear longitudinal tension spring 254R), a pair of rear vertical tension springs 258 (e.g., upper rear vertical tension spring 258U and lower rear vertical tension spring 258L), a rear upper clamp 260, a rear lower clamp 262, and rear clamp bolts 270.

The T-shaped rear tension devices 250 generally comprise a generally cylindrically shaped cross-bar (or horizontal leg) 280 and a generally cylindrically shaped upright bar (or vertical leg) 282. The upper T-shaped rear tension device 250U and the lower T-shaped rear tension device 250L are generally interchangeable.

The forward rear longitudinal tension spring 254F and the rearward rear longitudinal tension spring 254R are generally interchangeable. The upper rear vertical tension spring 258U and the lower rear vertical tension spring 258L are generally interchangeable. The forward rear longitudinal tension spring 254F, the rearward rear longitudinal tension spring 254R, the upper rear vertical tension spring 258U, and the lower rear vertical tension spring 258L are generally implemented as helical coil springs.

The rear outcropping 160 generally includes an upper arcuate recess (or channel) 300 and a lower arcuate recess 302. The upper arcuate recess 300 may have a radius RAD (e.g., RADa), and the lower arcuate recess 302 may have a radius LR (e.g., LRa) with both radii RAD and LR generally centered at radius center RC (e.g., RCa). The radii RAD and LR may be sized at an angle ARM (e.g., ARMa) to provide the arcuate movement RMa for the rear mounting subsystem 140a. The radius center RC is generally at the lateral center-line of the cylindrically shaped cross-bar 280 of the lower T-shaped rear tension device 250L. The angle ARM is generally in the range of 10 to 30 degrees larger than the arcuate movement RM to accommodate installation of the blade rear subsystem 140.

The cross-bar 280 of the upper T-shaped rear tension device 250U is generally snugly and longitudinally, arcuately, slidably restrained (e.g., held, mounted, fastened, installed, etc.) between the forward rear longitudinal tension spring 254F and the rearward rear longitudinal tension spring 254R in the upper arcuate recess 300.

The cross-bar 280 of the lower T-shaped rear tension device 250L is generally snugly and laterally, rotatably restrained (e.g., engaged, interlocked, etc.) in the lower arcuate recess 302. In another example (not shown), the lower T-shaped rear tension device 250L may be implemented having a throughbore in the cross-bar 280 such that a bolt or stud and nut may be implemented to rotatably mount the lower T-shaped rear tension device 250L within the rear blade mount subsystem 140 in lieu of the lower arcuate recess 302.

The rear clamp bolts 270 generally threadably, robustly mechanically couple (i.e., clamp) the blade rear 124 between the rear upper clamp 260 and the rear lower clamp 262 via the rear holes 128R. The rear upper clamp 260 may have an upper vertical cylindrical collar 304 having a receiving through bore 310 that generally slidably receives the vertical leg 282 of the upper T-shaped rear tension device 250U. The rear lower clamp 262 may have a lower vertical cylindrical collar 306 having a receiving through bore 312 that generally slidably receives the vertical leg 282 of the lower T-shaped rear tension device 250L.

The upper rear vertical tension spring 258U is generally coaxially installed on the vertical leg 282 of the upper T-shaped rear tension device 250U between the cross-bar 280 of the upper T-shaped rear tension device 250U and the upper vertical collar 304 of the rear upper clamp 260. The lower rear vertical tension spring 258L is generally coaxially installed on the vertical leg 282 of the lower T-shaped rear tension device 250L between the cross-bar 280 of the lower T-shaped rear tension device 250L and the upper vertical collar 306 of the rear lower clamp 262.

The forward rear longitudinal tension spring 254F, the rearward rear longitudinal tension spring 254R, the upper rear vertical tension spring 258U, and the lower rear vertical tension spring 258L generally provide respective selected (i.e., predetermined, chosen, calculated, etc.) rear compressive forces such that the blade rear mounting subsystem 140 retains of the blade 120 within the system 100 while providing the arcuate movement RM during normal operation of the cutting attachment system 100 such that cutting motion of the blade 120 is enhanced and damage to the blade 120 is reduced or prevented during normal operation.

To install the rear blade mounting subsystem, the forward rear longitudinal tension spring 254F, the rearward rear longitudinal tension spring 254R, the upper rear vertical tension spring 258U, and the lower rear vertical tension spring 258L are generally compressed and then released when the rear tension devices 250U and 250L have been positioned in the respective recesses 300 and 302.

In another example (not shown), the system 100 may be implemented having the front blade mount subsystem 130 implemented similarly to the rear blade mount subsystem 140 in lieu of the front blade mount subsystem 130 as described above to provide arcuate movement to the blade front 122 in addition to implementation of the rear blade mount subsystem 140 at the blade rear 124. In yet another example (not shown), the system 100 may be implemented having the rear blade mount subsystem 140 implemented similarly to the front blade mount subsystem 130 in lieu of the rear blade mount subsystem 140 as described above to provide fore/aft movement to the blade rear 124 in addition to implementation of the front blade mount subsystem 130 at the blade front 122.

The cutting apparatus 100 of the present invention may be advantageously augmented by further implementing an additional cutting apparatus (or apparatuses) across the front and top of the vehicle 50. Such an additional cutting apparatuses may, in one example, be implemented as a vehicle wire cutter as shown and described in U.S. Pat. No. 5,586,785 to Warner, et al., which is incorporated by reference herein in its entirety. However, such an additional cutting apparatus may be implemented as any appropriate device to meet the design criteria of a particular application.

While illustrated and described as a single device, the cutting system 100 may be implemented as a plurality of cutters 100 as shown and described herein when desired to meet the design criteria of a particular application.

As is apparent then from the above detailed description, the present invention may provide an improved system for a cutting apparatus that may be mounted to a vehicle.

Various alterations and modifications will become apparent to those skilled in the art without departing from the scope and spirit of this invention and it is understood this invention is limited only by the following claims.

What is claimed is:

1. A debris cutting system for attachment to a vehicle, the system comprising:
a nose shaped projection that extends horizontally from the vehicle, the projection comprising,
at least one front blade mount subsystem;
at least one rear blade mount subsystem; and
at least one blade, wherein
the blade has a blade front mounted to the front blade mount subsystem, a blade rear mounted to the rear blade mount subsystem, and teeth,
the blade is positioned substantially diagonal to the vehicle, and
the front blade mount subsystem provides longitudinal movement at the blade front, and the rear blade mount subsystem provides arcuate movement at the blade rear such that cutting of debris is enhanced and damage to the blade is reduced, wherein the projection further comprises:
a front forward support outcropping and a front rearward support outcropping having a front mount recess on a front side, wherein the front forward support outcropping and the front rearward support outcropping project laterally outward from the nose-shaped projection and provide support structure for the front blade mount subsystem, and support and hold the blade front within the front blade mount subsystem.

2. The system of claim 1, wherein the front blade mount subsystem further comprises:
an upper front slide;
a lower front slide;
a front slide bolt;
a slide bar mounted longitudinally between the front forward support outcropping and the front rearward support outcropping; and
a front tension spring that is coaxially mounted on the slide bar, wherein
the front mount recess holds a first end of the front tension spring,
the upper front slide, the blade front, and the lower front slide are mechanically coupled together via the front slide bolt,
a second end of the front tension spring compresses the upper front slide and the lower front slide against the front forward support outcropping, and
the upper front slide and the lower front slide move in the longitudinal direction on the slide rod.

3. The system of claim 1, wherein the projection further comprises a rear outcropping that projects laterally outward from the nose-shaped projection and having an upper arcuate recess and a lower arcuate recess, and provides support structure for the rear blade mount subsystem.

4. The system of claim 3, wherein the rear blade mount subsystem comprises:
an upper T-shaped rear tension device having a respective cylindrically shaped cross-bar and a cylindrically shaped upright bar;
a lower T-shaped rear tension device having a respective cylindrically shaped cross-bar and a cylindrically shaped upright bar;
a forward rear longitudinal tension spring;
a rearward rear longitudinal tension spring;
an upper rear vertical tension helical coil spring;
a lower rear vertical tension helical coil spring; and
a rear upper clamp having an upper vertical cylindrical collar having a respective receiving through bore that slidably receives the vertical bar of the upper T-shaped rear tension device and a rear lower clamp having a lower vertical cylindrical collar having a respective receiving through bore that slidably receives the vertical bar of the lower T-shaped rear tension device, and that mechanically couple the blade rear therebetween via rear clamp bolts, wherein
the upper rear vertical tension spring is coaxially installed on the vertical bar of the upper T-shaped rear tension device between the cross-bar of the upper T-shaped rear tension device and the upper vertical collar of the rear upper clamp,
the lower rear vertical tension spring is coaxially installed on the vertical bar of the lower T-shaped rear tension device between the cross-bar of the lower T-shaped rear tension device and the upper vertical collar of the rear lower clamp,
the cross-bar of the upper T-shaped rear tension device is snugly and longitudinally, arcuately, slidably restrained between the forward rear longitudinal tension spring and the rearward rear longitudinal tension spring in the upper arcuate recess, and
the cross-bar of the lower T-shaped rear tension device is snugly and laterally, rotatably restrained in the lower arcuate recess.

5. The system of claim 4, wherein
the upper T-shaped rear tension device and the lower T-shaped rear tension device are interchangeable,
the forward rear longitudinal tension spring and the rearward rear longitudinal tension spring are interchangeable, and
the upper rear vertical tension spring and the lower rear vertical tension spring are interchangeable.

6. The system of claim 1 further comprising a substantially arrowhead shaped tip at the apex of the projection, wherein the arrowhead shaped tip intersects, spreads and positions debris to be displaced or cut via the system.

* * * * *